United States Patent
Chung

(10) Patent No.: US 8,658,939 B2
(45) Date of Patent: Feb. 25, 2014

(54) LASER ANNEALING APPARATUS

(75) Inventor: Sung-Won Chung, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 1286 days.

(21) Appl. No.: 12/457,692

(22) Filed: Jun. 18, 2009

(65) Prior Publication Data

US 2009/0314755 A1 Dec. 24, 2009

(30) Foreign Application Priority Data

Jun. 18, 2008 (KR) .................. 10-2008-0057484

(51) Int. Cl.
*B23K 26/00* (2006.01)
*B23K 26/02* (2006.01)

(52) U.S. Cl.
USPC ................................ 219/121.77; 219/121.78

(58) Field of Classification Search
USPC ............ 219/121.77, 121.76, 121.65, 121.66, 219/121.78–121.8
See application file for complete search history.

(56) References Cited

U.S. PATENT DOCUMENTS

| | | | | |
|---|---|---|---|---|
| 2,834,270 A * | 5/1958 | Williams | ............ | 396/327 |
| 4,385,373 A * | 5/1983 | Howe | ............ | 369/44.15 |
| 4,495,407 A * | 1/1985 | Kodama et al. | ............ | 250/201.4 |
| 5,020,045 A * | 5/1991 | Smart et al. | ............ | 369/44.29 |
| 5,255,115 A * | 10/1993 | Kikuchi | ............ | 359/209.1 |
| 5,798,498 A * | 8/1998 | Zair | ............ | 219/121.83 |
| 6,246,524 B1 | 6/2001 | Tanaka | | |
| 7,473,622 B2 | 1/2009 | Yamazaki et al. | | |
| 7,645,337 B2 * | 1/2010 | Im et al. | ............ | 117/43 |
| 2002/0146873 A1 * | 10/2002 | Tanaka | ............ | 438/166 |

FOREIGN PATENT DOCUMENTS

JP 2007021557 2/2007

OTHER PUBLICATIONS

Korean Registration Determination Certificate dated Nov. 30, 2010, issued by KIPO corresponding to Korean Patent Application No. 10-2008-0057484.

* cited by examiner

*Primary Examiner* — Sang Paik
(74) *Attorney, Agent, or Firm* — Robert E. Bushnell, Esq.

(57) ABSTRACT

A laser annealing apparatus used in a crystallization process of an amorphous silicon thin film. The laser annealing apparatus includes a laser beam generation unit generating a laser beam, an optical system dividing the laser beam into a plurality of linear laser beams and including a focusing lens focusing the linear laser beams and projecting the focused linear laser beam on a substrate to be processed, and a focusing lens adjustment device adjusting a perpendicular distance and a rotation angle of the focusing lens relative to the substrate.

13 Claims, 5 Drawing Sheets
(1 of 5 Drawing Sheet(s) Filed in Color)

LASER ANNEALING APPARATUS

CLAIM OF PRIORITY

This application makes reference to, incorporates the same herein, and claims all benefits accruing under 35 U.S.C. §119 from an application earlier filed in the Korean Intellectual Property Office on Jun. 18, 2008 and there duly assigned Serial No. 10-2008-0057484.

BACKGROUND OF THE INVENTION

1. Field of the Invention

The present invention relates to a laser annealing apparatus, and more particularly, to a laser annealing apparatus including an adjustment device for tuning the shape of linear laser beams.

2. Description of the Related Art

In order to control electrical and physical characteristics of a semiconductor used as a channel in a thin film transistor, amorphous silicon, which is a component of the semiconductor, needs to be crystallized into polycrystalline silicon by subjecting amorphous silicon to a thermal treatment process. When a silicon thin film such as an amorphous silicon thin film or a monocrystalline silicon thin film is deposited as a semiconductor layer at a low temperature which is appropriate for a glass substrate, the deposited silicon thin film has a relatively low crystallinity.

As a method for improving the low crystallinity of the amorphous silicon thin film (hereinafter includes the monocrystalline silicon thin film), a laser annealing process in which a laser beam is projected onto the amorphous silicon thin film, is currently used. As a result of the instantaneous heating by the laser annealing process, crystallization of the amorphous silicon thin film is induced.

In the laser annealing process, the crystallization occurs due to the instantaneous heating. Thus, the laser annealing process has an advantage in that a glass substrate that is used as a substrate of an organic light-emitting diode (OLED) or a liquid crystal display (LCD), experiences less damage in comparison to a general heating process such as a furnace annealing process or a rapid thermal annealing process. The laser annealing process also has an advantage in that the electrical characteristics of crystallized polycrystalline silicon are excellent.

The laser annealing process is performed by generating a linear laser beam having a linear cross-sectional shape obtained by expanding or homogenizing an oscillated laser beam through a beam expander or a beam homogenizer, and focusing the expanded or homogenized laser beam through a cylindrical lens to form a single linear laser beam, and by projecting the linear laser beam onto the amorphous silicon thin film, and making the linear laser beam to scan the surface of the silicon thin film in a fixed scan pitch. In general, an excimer (exited dimer) laser beam which is a pulse laser, is used as a laser beam for the laser annealing process.

In a contemporary excimer laser annealing apparatus, a rectangular raw beam having a rectangular cross-sectional shape passes through an optical system including a beam homogenizer, a reflector, and a focusing lens to be divided into a plurality of linear laser beams that are subsequently overlapped and homogenized to finally form a single linear laser beam having a beam width (BW) of 0.4 mm and a beam length (BL) of 270 mm. That is, the cross-sectional shape of the linear laser beam is linear.

After the linear laser beam output from optical system is focused on a substrate to be annealed, the linear laser beam moves in a direction perpendicular to the lengthwise direction of the linear laser beam with a fixed scan pitch. Alternatively, a stage for holding the substrate may move in a direction opposite to the direction in which the linear laser beam moves. As a result, an amorphous silicon thin film on the substrate is annealed. In this case, regions where laser annealing is repeatedly performed, appear on the amorphous silicon thin film in accordance with a scan pitch of the linear laser beam, and these regions may create stripy stains due to an energy distribution profile of the linear laser beam across the widthwise direction of the linear laser beam. In other words, when the linear laser beam scans the irradiated surface of the amorphous silicon thin film by moving step-by-step with a fixed scan pitch in a direction perpendicular to the lengthwise direction of the linear laser beam, the region irradiated by the linear laser beam in a current scanning step will be overlapped by the region irradiated by the linear laser beam in a subsequent scanning step. The overlapped region may receive a laser energy which is different than that of other region. As a result, the amorphous silicon thin film will receive uneven laser energy and a stripy pattern will be formed on the amorphous silicon thin film.

In order to avoid the stripy pattern, the energy distribution of the linear laser beam must be controlled to have a desired profile. If the desired energy distribution profile of the linear laser beam can not be obtained, however, the optical system has to be modified and reset. Furthermore, if the desired energy distribution profile of the linear laser beam changes due to a reason, for example, a thickness of the substrate or a surface to be processed (the amorphous silicon thin film) changes during an annealing process, the contemporary excimer laser annealing apparatus has to be manually modified and the optical system have to be reset.

SUMMARY OF THE INVENTION

It is therefore an object of the present invention to provide an improved laser annealing apparatus and an improved laser annealing process.

It is another object to provide a laser annealing apparatus by which a desired energy distribution profile of a laser beam is obtained by controlling a perpendicular distance and/or a rotation angle between an optical system and a substrate to be processed, without resetting the optical system.

According to an aspect of the present invention, a laser annealing apparatus may be constructed with a laser beam generation unit generating a laser beam, an optical system dividing the laser beam into a plurality of linear laser beams and including a focusing lens for focusing the linear laser beams to form a focused linear laser beam and projecting the focused linear laser beam onto a substrate to be processed, and a focusing lens adjustment device adjusting a perpendicular distance and a rotation angle of the focusing lens relative to the substrate.

The laser beam may be an excimer laser beam.

The laser beam generated by the laser beam generation unit may be a rectangular laser beam.

The optical system may further include a beam homogenizer dividing the laser beam generated by the laser beam generation unit, into the plurality of linear laser beams and homogenizing the linear laser beams.

The optical system may further include a reflector changing a path of the laser beam generated by the laser beam generation unit, in a direction perpendicular to the original path of the laser beam.

The reflector may be a mirror.

The focusing lens may be disposed between the reflector and the substrate.

The focusing lens may be a cylindrical lens.

The focusing lens adjustment device may include a worm gear including a pair of worms and a pair of worm wheels, which are symmetrically disposed near both sides of the focusing lens relative to a vertical line passing through a center of the focusing lens and are respectively.

The worms may be separately connected to driving motors which are symmetrically disposed near both sides of the focusing lens relative to a vertical line passing through a center of the focusing lens and are respectively, the worm wheels may be separately and symmetrically connected to both sides of the focusing lens relative to a vertical line passing through a center of the focusing lens and are respectively, and driving force of each driving motor may be transferred to the focusing lens.

The perpendicular distance of the focusing lens relative to the substrate may be adjusted by controlling a voltage applied to each driving motor.

The rotation angle of the focusing lens relative to the substrate may be adjusted by controlling a voltage applied to each driving motor.

The laser annealing apparatus may further include a stage on which the substrate is mounted and which moves the substrate.

The stage may move in a direction perpendicular to the lengthwise direction of the linear laser beams.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, the present invention will be described in detail by explaining embodiments of the invention with reference to the attached drawings.

Figure 1:
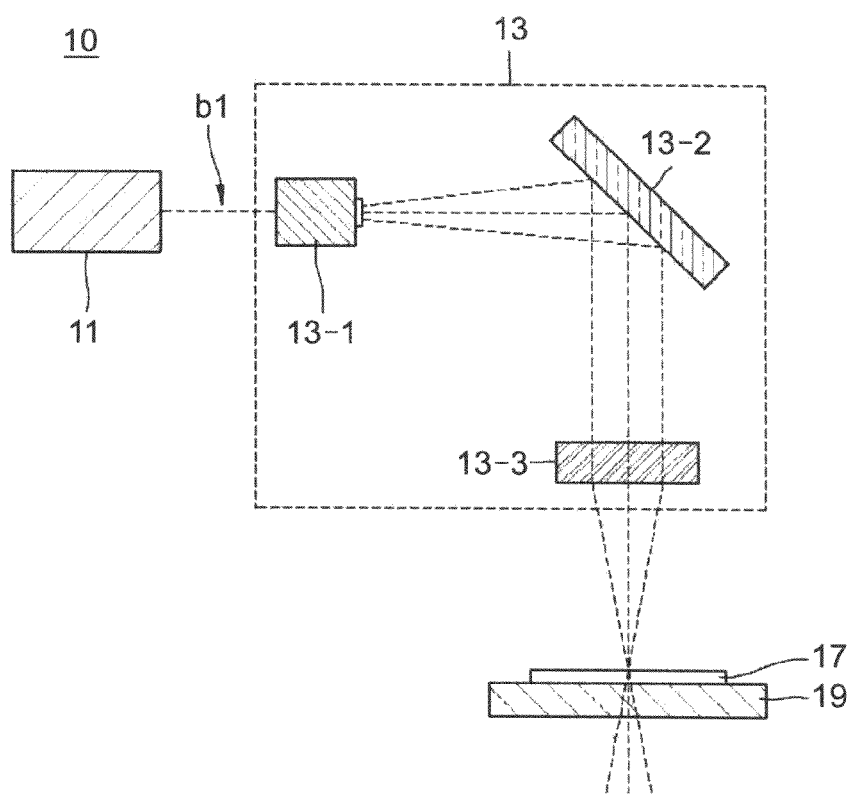
FIG. 1 is a schematic structural view of a contemporary excimer laser annealing apparatus.
Figure 2:
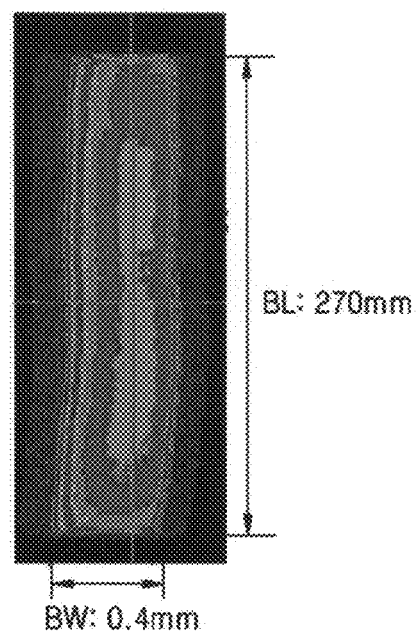
FIG. 2 is a color image that shows an example of a linear laser beam generated by the conventional excimer laser annealing apparatus illustrated in FIG. 1, which details beam width (BW) and beam length (BL) of that linear laser beam.
Figure 3:
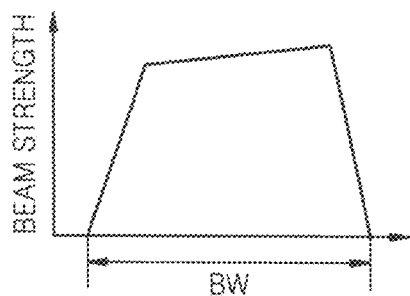
FIG. 3 is a graph showing an energy distribution in terms of beam strength, for the linear laser beam across the widthwise direction of the linear laser beam, on a beam-projected surface.

FIG. 1 is a schematic structural view of a contemporary excimer laser annealing apparatus 10. FIG. 2 shows an example of a linear laser beam, which details beam width (BW) and beam length (BL) of that linear laser beam. FIG. 3 is a graph showing an energy distribution of the linear laser beam illustrated in FIG. 2 across the widthwise direction of the linear laser beam on a beam-projected surface, when a laser annealing process is performed. In the graph of FIG. 3, the vertical axis indicates the energy strength of the linear laser beam, and the horizontal axis indicates the widthwise direction of the linear laser beam.

Referring to FIGS. 1, 2, and 3, in contemporary excimer laser annealing apparatus 10, a rectangular raw beam b1 having a rectangular cross-sectional shape and a size of 15 mm×35 mm is generated from a laser beam generator 11, passes through an optical system 13 including a beam homogenizer 13-1, a reflector 13-2, and a focusing lens 13-3, to be divided into a plurality of linear laser beams that are subsequently homogenized and overlapped (converged) to finally form a single linear laser beam having a beam width (BW) of 0.4 mm and a beam length (BL) of 270 mm (refer to FIG. 2). The linear laser beam has a linear cross-sectional shape.

After the single linear laser beam output from optical system 13 is projected onto substrate 17, the linear laser beam scans the exposed upper surface of substrate 17 by moving in a direction perpendicular to the lengthwise direction of the linear laser beam with a fixed scan pitch. Alternatively, a stage 19 for holding substrate 17 may move in a direction opposite to the direction in which the linear laser beams moves. As a result, an amorphous silicon thin film on the exposed upper surface of substrate 17 is annealed. In this case, regions where laser annealing is repeatedly performed, appear on the amorphous silicon thin film in accordance with a scan pitch of the linear laser beam; and these regions may create stripy stains due to an energy distribution profile of the linear laser beam across the widthwise direction of the linear laser beam. In other words, when the linear laser beam scans the irradiated surface of the amorphous silicon thin film by moving step-by-step with a fixed scan pitch in a direction perpendicular to the lengthwise direction of the linear laser beam, the region irradiated by the linear laser beam in a current scanning step may be overlapped by the region irradiated by the linear laser beam in a subsequent scanning step. The overlapped region may receive a laser energy which is different than that of other region. As a result, the amorphous silicon thin film will receive uneven laser energy and a stripy pattern will be formed on the amorphous silicon thin film.

In order to avoid the formation of the stripy pattern, the linear laser beam output from optical system 13 should have a desired energy distribution profile as shown in FIG. 3. The energy distribution profile shown in FIG. 3 is the actual energy distribution profile of the linear laser beam output from a contemporary laser annealing apparatus. On the other hand, the desired energy distribution profile refers to an energy distribution profile of a linear laser beam which is desired by the user in order to avoid a stripy pattern. If the desired energy distribution profile of the linear laser beam output from optical system 13 differs from the shape shown in FIG. 3, however, optical system 13 has to be modified and reset. Furthermore, if the desired energy distribution profile of the linear laser beam changes due to a reason, for example, a thickness of substrate 17 or a surface to be processed (the amorphous silicon thin film) changes during an annealing process, the contemporary excimer laser annealing apparatus 10 has to be manually modified and optical system 13 have to be reset.

Figure 4:
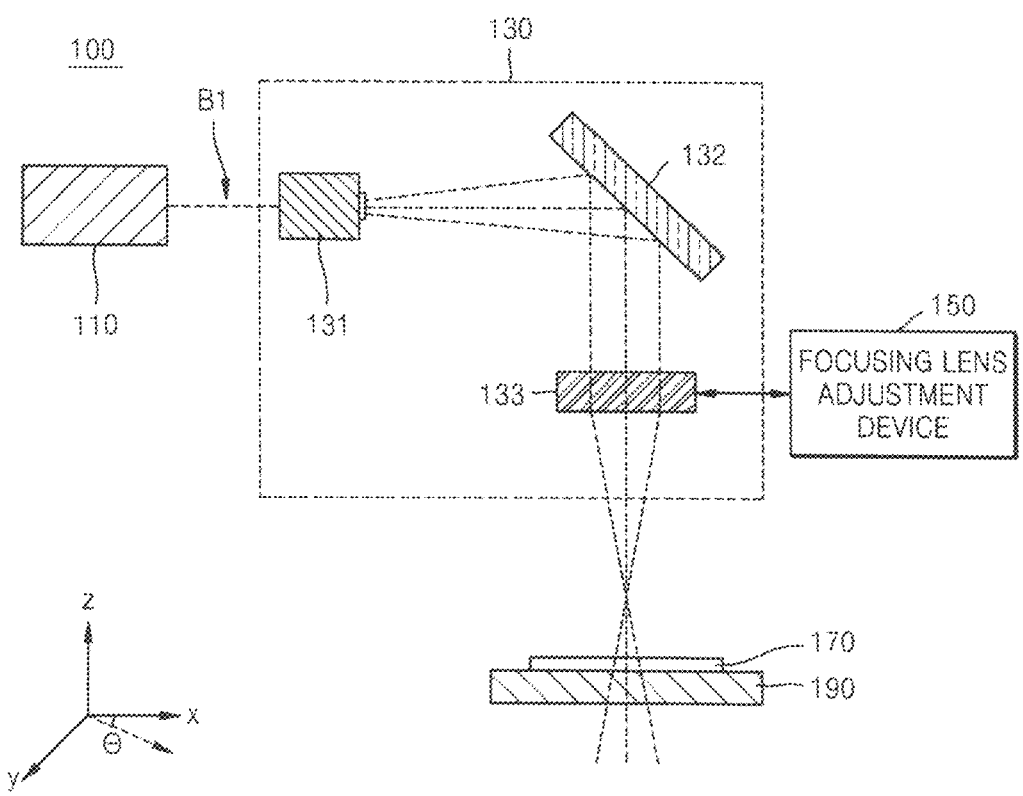
FIG. 4 is a schematic structural view of a laser annealing apparatus constructed as an embodiment according to the principles of the present invention.

FIG. 4 is a schematic structural view of a laser annealing apparatus 100 constructed as to an embodiment according to the principles of the present invention.

Referring to FIG. 4, laser annealing apparatus 100 according to the current embodiment of the principles of the present invention includes a laser beam generation unit 110, an optical system 130 including a beam homogenizer 131, a reflector 132, and a focusing lens 133, and a focusing lens adjustment device 150 adjusting positions of focusing lens 133.

According to the current embodiment of the principles of the present invention, a device for oscillating a XeCl excimer laser beam having a wavelength of 308 nm is used as laser beam generation unit 110. Alternatively, a device for oscillating, for example, a KrF excimer laser beam (wavelength 248 nm), an ArF excimer laser beam (wavelength 193 nm), or a KrCl excimer laser beam (wavelength 222 nm), may be used.

A rectangular laser beam B1 with a rectangular cross-sectional shape is generated from the laser beam generation unit 110, passes through optical system 130 that is appropriately prepared to be transformed into a linear laser beam. In this case, optical system 130 is designed so as to homogenize an energy distribution of the linear laser beam at the same time. In more detail, an element of optical system 130 divides the rectangular laser beam B1 in either the widthwise direction or the lengthwise direction of the rectangular laser beam B1 into a plurality of linear laser beams, overlaps and homogenizes the plurality of linear laser beams to form a single linear laser beam, and thus homogenizes an energy distribution of the linear laser beam across the widthwise or lengthwise direction of the linear laser beam.

In FIG. 4, beam homogenizer 131 is separated from reflector 132 and focusing lens 133 in optical system 130. Optical system 130 is, however, functionally divided in this manner for convenience of explanation. The present invention is not limited thereto. In more detail, optical system 130 generally may include any optical element which can homogenize an energy distribution of the linear laser beam. If either reflector 132 or focusing lens 133 is able to homogenize an energy distribution of the linear laser beam, that reflector 132 or focusing lens 133 may be referred to as beam homogenizer 131.

Although not shown in FIG. 4, beam homogenizer 131 may be composed of an optical element including a plurality of lenses. Using an aspheric lens or a combined lens composed of a plurality of lenses as the optical element of beam homogenizer 131, aberrations are reduced, and thus beam homogenizer 131 is more advantageous to homogenize an energy distribution of laser beams.

Reflector 132 changes a path of the laser beam generated from the laser beam generation unit 110, in a direction perpendicular to the original path, to project the laser beam onto focusing lens 133 such that the laser beam irradiates an exposed upper surface of substrate 170. A mirror may be used as reflector 132.

In FIG. 4, reflector 132 is included in optical system 130. The present invention is not, however, limited thereto. Reflector 132 may be omitted form optical system 130.

Focusing lens 133 focuses the divided linear laser beams to form a single linear laser beam. Preferably, the divided linear laser beams are focused on the exposed upper surface of substrate 170. That is, the divided linear laser beams overlap with each other to form a single linear laser beam. A cylindrical lens may be used as focusing lens 133.

After the linear laser beam passed through optical system 130 is projected onto substrate 170 that is an insulation substrate, it is preferable to anneal an amorphous silicon thin film on the exposed upper surface of substrate 170 by moving the linear laser beam in a direction perpendicular to the lengthwise direction of the linear laser beam, or by moving substrate 170 (or stage 190 for holding substrate 170) in a direction opposite to the direction in which the linear laser beam is moved.

Referring to FIG. 1, in the contemporary excimer laser annealing apparatus 10, although the linear laser beam are focused by focusing lens 13-3, if an energy distribution of the linear laser beam generated by contemporary excimer laser annealing apparatus 10 does not have a desired profile, regions where laser annealing is repeatedly performed, appear on an amorphous silicon thin film on the exposed upper surface of substrate 17 in accordance with a scan pitch of the linear laser beam, and such regions may create stripy stains due to the energy distribution profile of the linear laser beam across the widthwise direction of the linear laser beam.

If the above-described problem occurs, the contemporary excimer laser annealing apparatus 10 has to be modified to reset all elements of optical system 13 that are related to the energy distribution of the linear laser beam. Furthermore, if the desired energy distribution profile of the linear laser beam changes due to a reason, for example, a thickness of the substrate 17 or a surface to be processed (the amorphous silicon thin film) changes during an annealing process, the contemporary excimer laser annealing apparatus 10 also has to be modified to reset all elements of optical system 13, that are related to the energy distribution of the linear laser beams.

Referring back to FIG. 4, laser annealing apparatus 100 according to the current embodiment of the present invention, however, solves the above-described problem by adjusting positions of focusing lens 133 using focusing lens adjustment device 150, instead of resetting optical system 130.

Focusing lens adjustment device 150 according to the current embodiment of the present invention adjusts a perpendicular distance z and a rotation angle θ of focusing lens 133 with respect to substrate 170. That is, perpendicular distance z refers to a distance between focusing lens 133 and substrate 170 along a perpendicular line drawn from the center of focusing lens 133 to a major surface of substrate 170 at right angles. Rotation angle θ refers to an angle of rotation of focusing lens 133 about an axis which is parallel to the major surface of substrate 170.

Figure 5:
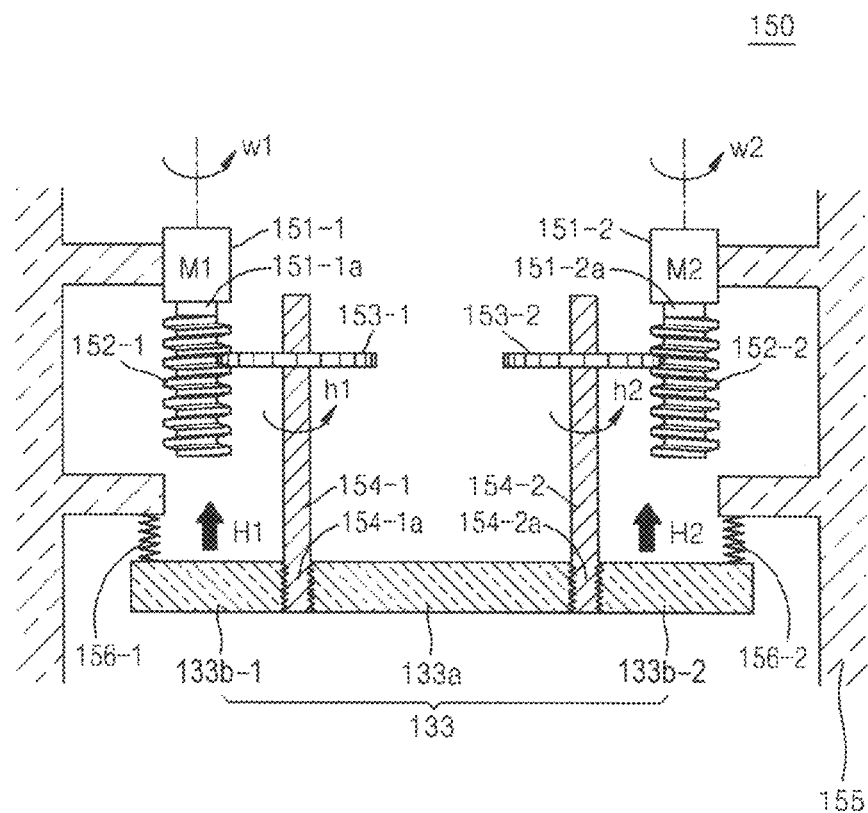
FIG. 5 is a schematic conceptual view of examples of a focusing lens and a focusing lens adjustment device illustrated in FIG. 4 that may be used in the practice of the principles of the present invention.

FIG. 5 is a schematic conceptual view of examples of focusing lens 133 and focusing lens adjustment device 150 illustrated in FIG. 4, with the orientation of motor units M1 151-1 and M2 151-2 being incorrectly shown in order to emphasize the functional and operational relations between worms 152-1 and 152-2 and worm wheels 153-1 and 153-2.

Figure 6:
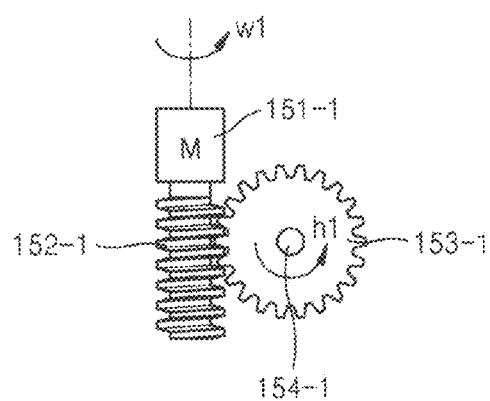
FIG. 6 is a schematic conceptual view showing actual spatial arrangements of the worms and worm wheels illustrated in FIG. 5 in the practice of the principles of the present invention.

FIG. 6 is a schematic conceptual view showing actual spatial arrangements of worms 152-1 and 152-2 and worm wheels 153-1 and 153-2 illustrated in FIG. 5.

Referring to FIGS. 5 and 6, focusing lens adjustment device 150 includes a pair of motor units M1 151-1 and M2 151-2 that are symmetrical relative to a central line perpendicular to a major surface focusing lens 133 and which are formed on a frame 155, worms 152-1 and 152-2 that are respectively connected to driving shafts 151-1a and 151-2a of motor units M1 151-1 and M2 151-2, worm wheels 153-1 and 153-2 that are respectively combined with worms 152-1 and 152-2, and worm wheel shafts 154-1 and 154-2 which are respectively connected to worms 152-1 and 152-2. As shown in FIGS. 5 and 6, each one of worms 152-1 and 152 is in the form of a screw and is constructed with a cylindrical shaft on which spiral threads have been cut. As shown in FIG. 6, the threads of worms 152-1 and 152 gear with the teeth of worm wheels 153-1 and 153-2, respectively.

Motor units M1 151-1 and M2 151-2 are symmetrically formed relative to the central line perpendicular to the major surface focusing lens 133 and are fixed on frame 155. When a driving voltage is applied, worms 152-1 and 152-2 are respectively rotated in counterclockwise directions w1 and w2 by using driving shafts 151-1a and 151-2a of motor units M1 151-1 and M2 151-2 as central axes. Worms 152-1 and 152-2 which are driving gears (also know as spur gears), respectively drive and rotate worm wheels 153-1 and 153-2 and worm wheel shafts 154-1 and 154-2, which are driven gears, in counterclockwise directions h1 and h2. In this case, screw units 154-1a and 154-2a which are respectively disposed at end portions of worm wheel shafts 154-1 and 154-2, are screwed on focusing lens 133 and thus may move up and down along worm wheel shafts 154-1 and 154-2, that is, may respectively move along movement paths H1 and H2 indicated on FIG. 5.

FIG. 5 is not an exact cross-sectional diagram regarding focusing lens 133 and focusing lens adjustment device 150. For convenience of explanation, views of various angles are combined to each other. Although FIG. 5 illustrates as if rotation axes of worms 152-1 and 152-2 and rotation axes of worm wheels 153-1 and 153-2 exist on the same plane, in fact, the rotation axes are rotated in spatially perpendicular directions as illustrated in FIG. 6. Also, although FIG. 5 illustrates as if a movement direction of focusing lens 133, based on the rotation axes of worms 152-1 and 152-2, is an upward direction, in fact, it has to be understood that the movement paths H1 and H2 are along a direction perpendicular to a ground surface.

Elastic retarders 156-1 and 156-2 may further be included at end portions of frame 155. Elastic retarders 156-1 and 156-2 prevent abrupt operations of optical system 130 which is sensitive, by smoothly changing movement paths of focusing lens 133.

Figure 7:
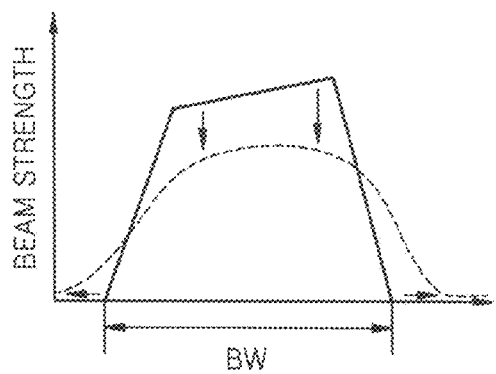
FIG. 7 is a graph showing changes in an energy distribution profile of a linear laser beam across the widthwise direction of the linear laser beam on a beam-projected surface when a perpendicular distance between a focusing lens outputting the linear laser beam and the beam-projected surface changes due to a manipulation of the focusing lens adjustment device illustrated in FIGS. 4 and 5.

FIG. 7 is a graph showing changes in an energy distribution of the linear laser beam across the widthwise direction of the linear laser beam on a beam-projected surface when a perpendicular distance of focusing lens 133 changes due to the manipulation of focusing lens adjustment device 150 illustrated in FIGS. 4 and 5.

Figure 8:
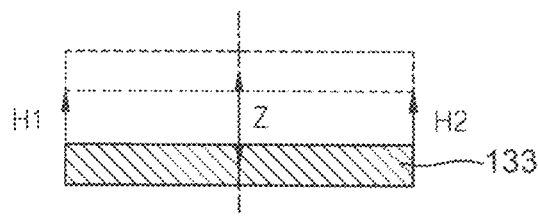
FIG. 8 shows an example of changing a perpendicular distance of a focusing lens relative to a substrate during the practice of the present invention, in which opposite ends of the focusing lens are subjected to the same displacement.
Figure 9:
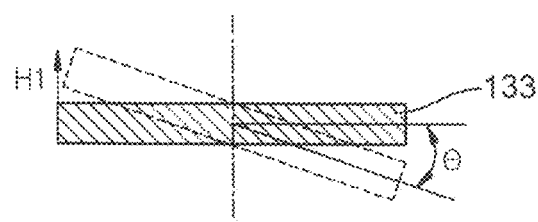
FIG. 9 shows an example of changing a rotation angle of a focusing lens relative to a substrate during the practice of the present invention.
Figure 10:
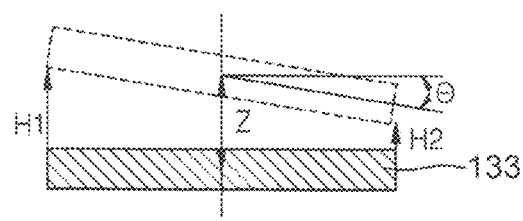
FIG. 10 shows an example of changing both of a perpendicular distance and a rotation angle of a focusing lens relative to a substrate during the practice of the present invention.

FIGS. 8 through 10 show changes in a perpendicular distance z and/or a rotation angle θ of focusing lens 133 illustrated in FIGS. 4 and 5 in accordance with movement paths H1 and H2 of focusing lens 133 that is moved by focusing lens adjustment device 150 illustrated in FIGS. 4 and 5, according to embodiments of the present invention. FIGS. 8 through 10 will be described in conjunction with FIGS. 4 and 5.

FIG. 8 shows a case when movement paths H1 and H2 at radially opposite sides 133b-1 and 133b-2 of focusing lens 133 that are adjusted by focusing lens adjustment device 150 are the same (H1=H2). Such a case happens when the same voltage is applied to motor units M1 151-1 and M2 151-2 near both sides 133b-1 and 133-2 of focusing lens 133. Both sides 133b-1 and 133-2 of focusing lens 133 move in parallel relative to substrate 170 and thus only perpendicular distance z between focusing lens 133 and substrate 170 changes and rotation angle θ of focusing lens 133 does not change.

As such, by moving focusing lens 133 closer to reflector 132, a beam having a weak strength and a smooth energy distribution profile may be obtained. If a user desires such a smooth energy distribution profile of the laser beam, although optical system 130 is already set, the user may obtain the desired energy distribution profile by manipulating focusing lens adjustment device 150 without resetting optical system 130. Also, focusing lens adjustment device 150 may be easily and automatically manipulated by selecting voltages to be applied to motor units M1 151-1 and M2 151-2.

FIG. 9 shows a case when only one side 133b-1 of focusing lens 133 is moved by focusing lens adjustment device 150 (H1≠0, H2=0). Such a case happens when a voltage is applied to motor unit M1 151-1 near side 133b-1 of focusing lens 133 and thus focusing lens 133 is rotated by rotation angle θ relative to substrate 170. When the energy strength of a laser beam differs along the lengthwise direction of the laser beam, uniformity of the laser beam in accordance with the lengthwise direction of the laser beam may be controlled by changing rotation angle θ.

FIG. 10 shows a case when movement path H1 of one side 133b-1 of focusing lens 133 that is adjusted by focusing lens adjustment device 150, is larger than movement path H2 of the other side 133b-2 of focusing lens 133 (H1, H2≠0, and H1>H2). Such a case happens when different voltages are applied to motor units M1 151-1 and M2 151-2 near both sides of focusing lens 133. Side 133b-1 of focusing lens 133 moves along movement path H1 and side 133b-2 of focusing lens 133 moves along movement path H2, relative to substrate 170, and thus focusing lens 133 is rotated by a rotation angle θ relative to substrate 170. Such changes in both perpendicular distance z and rotation angle θ may control the energy distribution across both widthwise and lengthwise directions of the laser beam to be uniform.

As described above, laser annealing apparatus 100 in the practice of the principles of the present invention is constructed with focusing lens adjustment device 150 that changes perpendicular distance z and rotation angle θ of focusing lens 133 with respect to substrate 170, and thus, although a desired energy distribution profile of the laser beam changes, the desired energy distribution profile of the laser beam may be obtained by using focusing lens adjustment device 150 without resetting optical system 130.

As described above, according to the present invention, a desired energy distribution profile of a laser beam may be obtained by adjusting a perpendicular distance and a rotation angle of a focusing lens relative to a substrate to be irradiated, without resetting an optical system.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A laser annealing apparatus, comprising:
a laser beam generation unit generating a laser beam providing annealing of an amorphous silicon thin film;
an optical system dividing the laser beam into a plurality of linear laser beams and comprising a focusing lens focusing the divided linear laser beams to form a focused linear laser beam, and projecting the focused linear laser beam onto a substrate; and
a focusing lens adjustment device comprising a worm gear comprising a pair of worms and a pair of worm wheels, which are symmetrically disposed near both sides of the focusing lens relative to a vertical line passing through a center of the focusing lens, and adjusting a perpendicular distance and a rotation angle of the focusing lens with respect to the substrate via the worm gear.

2. The laser annealing apparatus of claim 1, wherein the laser beam is an excimer laser beam.

3. The laser annealing apparatus of claim 1, wherein the laser beam generated by the laser beam generation unit is a rectangular laser beam.

4. The laser annealing apparatus of claim 1, wherein the optical system further comprises a beam homogenizer dividing the laser beam generated by the laser beam generation unit into the plurality of linear laser beams and homogenizing the linear laser beams.

5. The laser annealing apparatus of claim 1, wherein the optical system further comprises a reflector changing a path of the laser beam generated by the laser beam generation unit in a direction perpendicular to the original path of the laser beam.

6. The laser annealing apparatus of claim 5, wherein the reflector is a mirror.

7. The laser annealing apparatus of claim 6, wherein the focusing lens is disposed between the reflector and the substrate.

8. The laser annealing apparatus of claim 1, wherein the focusing lens is a cylindrical lens.

9. The laser annealing apparatus of claim 1, wherein the worms are separately connected to driving motors that are symmetrically disposed on both radially opposite sides of the focusing lens relative to the vertical line passing through the center of the focusing lens;
wherein the worm wheels are symmetrically disposed relative to the vertical line passing through the center of the focusing lens and respectively connect to both sides of the focusing lens; and
wherein driving force of each driving motor is transferred to the corresponding sides of the focusing lens.

10. The laser annealing apparatus of claim 9, wherein the perpendicular distance of the focusing lens relative to the substrate is adjusted by controlling a voltage applied to each driving motor.

11. The laser annealing apparatus of claim 9, wherein the rotation angle of the focusing lens relative to the substrate is adjusted by controlling a voltage applied to each driving motor.

12. The laser annealing apparatus of claim 1, further comprising a stage on which the substrate is mounted and which moves the substrate.

13. The laser annealing apparatus of claim 12, wherein the stage moves in a direction perpendicular to the lengthwise direction of the linear laser beam.

* * * * *